United States Patent
Lai et al.

(10) Patent No.: US 10,469,816 B2
(45) Date of Patent: Nov. 5, 2019

(54) PROJECTION SYSTEM AND MONITORING METHOD THEREOF AND DISPLAY SYSTEM AND MONITORING METHOD THEREOF

(71) Applicant: Coretronic Corporation, Hsin-Chu (TW)

(72) Inventors: Hsin-Ya Lai, Hsin-Chu (TW); Jui-Chi Chen, Hsin-Chu (TW); Fu-Shan Wang, Hsin-Chu (TW); Heng-CHeng Chen, Hsin-Chu (TW); Chueh-Ching Chen, Hsin-Chu (TW); Ching-Ho Chang, Hsin-Chu (TW)

(73) Assignee: Coretronic Corporation, Hsin-Chu (TW)

( * ) Notice: Subject to any disclaimer, the term of this patent is extended or adjusted under 35 U.S.C. 154(b) by 0 days.

(21) Appl. No.: 16/166,176

(22) Filed: Oct. 22, 2018

(65) Prior Publication Data

US 2019/0124310 A1   Apr. 25, 2019

(30) Foreign Application Priority Data

Oct. 23, 2017 (CN) .......................... 2017 1 0994139

(51) Int. Cl.
  *G03B 21/16*  (2006.01)
  *H04N 9/31*  (2006.01)
  *G03B 21/14*  (2006.01)

(52) U.S. Cl.
  CPC ......... *H04N 9/3194* (2013.01); *G03B 21/147* (2013.01); *G03B 21/16* (2013.01);
  (Continued)

(58) Field of Classification Search
  CPC ........ G03B 21/14; G03B 21/16; G03B 21/18; G03B 21/147; H04N 9/3144; H04N 9/3194
  See application file for complete search history.

(56) References Cited

U.S. PATENT DOCUMENTS 8,325,234 B2   12/2012   Kii
2015/0070594 A1*   3/2015   Trachtenberg ........... H04N 5/64
                                                                 348/841

(Continued)

FOREIGN PATENT DOCUMENTS

WO   2013153281   10/2013

*Primary Examiner* — Sultran Chowdhury
(74) *Attorney, Agent, or Firm* — JCIPRNET

(57) ABSTRACT

A projection system, a display system and monitoring methods thereof are provided. The projection system includes at least one projection device, at least one sensing device and a remote device. The at least one projection device is coupled to the at least one sensing device. The at least one sensing device senses a plurality of environmental parameters and a plurality of device output values on the at least one projection device. The remote device receives the environmental parameters and the device output values to execute state analysis for the at least one projection device, so as to generate at least one analysis result. The remote device further generates a command signal according to the at least one analysis result, and transmits the command signal to the at least one projection device. The at least one projection device executes a self-protection procedure according to the command signal.

31 Claims, 6 Drawing Sheets

(52) U.S. Cl.
CPC ......... *H04N 9/3144* (2013.01); *H04N 9/3147* (2013.01); *H04N 9/3185* (2013.01)

(56) References Cited

U.S. PATENT DOCUMENTS

2015/0293436 A1* 10/2015 Drumm ................ H04N 9/3129
  353/20
2015/0331303 A1    11/2015 Chuang et al.
2017/0104970 A1     4/2017 Li

* cited by examiner

PROJECTION SYSTEM AND MONITORING METHOD THEREOF AND DISPLAY SYSTEM AND MONITORING METHOD THEREOF

CROSS-REFERENCE TO RELATED APPLICATION

This application claims the priority benefit of China application serial no. 201710994139.6, filed on Oct. 23, 2017. The entirety of the above-mentioned patent application is hereby incorporated by reference herein and made a part of this specification.

BACKGROUND OF THE INVENTION

Field of the Invention

The invention relates to a projection system, and particularly relates to a monitoring method of a projection system.

Description of Related Art

Along with development of electronic technology, electronic devices have become indispensable tools in people's daily life. In order to provide a good man-machine interface, to provide excellent display images also becomes an essential function of electronic devices nowadays.

In order to provide a large-scale display image, projection device is a preferred option. However, regarding such type of a display system, after the projection devices are installed, it is unable to learn whether a working condition of each of the projection devices is normal, and the maintenance personnel would carry out a maintenance action only if an actual failure state occurs. If the projection device fails and cannot work normally in an important occasion, an unexpected significant loss may be caused.

The information disclosed in this Background section is only for enhancement of understanding of the background of the described technology and therefore it may contain information that does not form the prior art that is already known to a person of ordinary skill in the art. Further, the information disclosed in the Background section does not mean that one or more problems to be resolved by one or more embodiments of the invention was acknowledged by a person of ordinary skill in the art.

SUMMARY OF THE INVENTION

The invention is directed to a projection system and a monitoring method thereof and a display system and a monitoring method thereof, which are adapted to effectively maintain availability of a projection device or a display device.

In order to achieve one or a portion of or all of the objects or other objects, an embodiment of the invention provides a projection system including at least one projection device, at least one sensing device and a remote device. The at least one projection device is coupled to the at least one sensing device. The remote device is coupled to the at least one projection device. The at least one sensing device senses a plurality of environmental parameters and a plurality of device output values on the at least one projection device. The remote device receives the plurality of environmental parameters and the plurality of device output values to execute state analysis for the at least one projection device according to the plurality of environmental parameters and the plurality of device output values to generate at least one analysis result. The remote device further generates a command signal according to the at least one analysis result, and transmits the command signal to the at least one projection device. The at least one projection device executes a self-protection procedure according to the command signal.

In order to achieve one or a portion of or all of the objects or other objects, an embodiment of the invention provides a monitoring method of a projection system, which includes: providing at least one projection device; configuring at least one sensing device for coupling to the at least one projection device; using the at least one sensing device to sense a plurality of environmental parameters and a plurality of device output values on the at least one projection device; providing a remote device for coupling to the at least one projection device, where the remote device receives the plurality of environmental parameters and the plurality of device output values to execute state analysis for the at least one projection device according to the plurality of environmental parameters and the plurality of device output values to generate at least one analysis result; using the remote device to generate a command signal according to the at least one analysis result, and transmitting the command signal to the at least one projection device; and using the at least one projection device to execute a self-protection procedure according to the command signal.

In order to achieve one or a portion of or all of the objects or other objects, an embodiment of the invention provides a display system including at least one display device, at least one sensing device and a remote device. The at least one display device is coupled to the at least one sensing device. The remote device is coupled to the at least one display device. The at least one sensing device senses a plurality of environmental parameters and a plurality of device output values on the at least one display device. The remote device receives the plurality of environmental parameters and the plurality of device output values to execute state analysis for the at least one display device according to the plurality of environmental parameters and the plurality of device output values to generate at least one analysis result. The remote device further generates a command signal according to the at least one analysis result, and transmits the command signal to the at least one display device. The at least one display device executes a self-protection procedure according to the command signal.

In order to achieve one or a portion of or all of the objects or other objects, an embodiment of the invention provides a monitoring method of a display system, which includes: providing at least one display device; configuring at least one sensing device for coupling to the at least one display device; using the at least one sensing device to sense a plurality of environmental parameters and a plurality of device output values on the at least one display device; providing a remote device for coupling to the at least one display device, where the remote device receives the plurality of environmental parameters and the plurality of device output values to execute state analysis for the at least one display device according to the plurality of environmental parameters and the plurality of device output values to generate at least one analysis result; using the remote device to generate a command signal according to the at least one analysis result, and transmitting the command signal to the at least one display device; using the at least one display device to execute a self-protection procedure according to the command signal.

According to the above description, in the embodiment of the invention, by sensing a plurality of environmental parameters and a plurality of device output values on the projection device or the display device, an execution state of the projection device or the display device is determined, and the command signal is generated according to the execution state of the projection device or the display device to achieve an effect of activating the self-protection procedure of the projection device or the display device. In this way, availability of the projection device or the display device is guaranteed, and use efficiency of the projection device or the display device is improved.

In light of the above, the embodiments of the invention at least exhibit one of the advantages or effects below. In the invention, the display image of the light field display apparatus is calibrated by capturing the combination image generated by the light field display apparatus, comparing the error information between the original display image and the combination image, and adjusting at least one of the plurality of block images correspondingly generating the error information according to the error information. Through the image calibration means of the invention, without hardware adjustment means, the light field display apparatus can adaptively adjust the display image according to the user parameters corresponding to the user properties to enhance display quality of the light field display apparatus.

Other objectives, features and advantages of the invention will be further understood from the further technological features disclosed by the embodiments of the invention wherein there are shown and described preferred embodiments of this invention, simply by way of illustration of modes best suited to carry out the invention.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principles of the invention.

DESCRIPTION OF EMBODIMENTS

In the following detailed description of the preferred embodiments, reference is made to the accompanying drawings which form a part hereof, and which are shown by way of illustrating specific embodiments in which the invention may be practiced. In this regard, directional terminology, such as "top," "bottom," "front," "back," etc., is used with reference to the orientation of the Figure(s) being described. The components of the invention can be positioned in a number of different orientations. As such, the directional terminology is used for purposes of illustration and is in no way limiting. On the other hand, the drawings are only schematic and the sizes of components may be exaggerated for clarity. It is to be understood that other embodiments may be utilized and structural changes may be made without departing from the scope of the invention. Also, it is to be understood that the phraseology and terminology used herein are for the purpose of description and should not be regarded as limiting. The use of "including," "comprising," or "having" and variations thereof herein is meant to encompass the items listed thereafter and equivalents thereof as well as additional items. Unless limited otherwise, the terms "connected," "coupled," and "mounted" and variations thereof herein are used broadly and encompass direct and indirect connections, couplings, and mountings. Similarly, the terms "facing," "faces," and variations thereof herein are used broadly and encompass direct and indirect facing, and "adjacent to" and variations thereof herein are used broadly and encompass directly and indirectly "adjacent to". Therefore, the description of "A" component facing "B" component herein may contain the situations that "A" component directly faces "B" component or one or more additional components are between "A" component and "B" component. Also, the description of "A" component "adjacent to" "B" component herein may contain the situations that "A" component is directly "adjacent to" "B" component or one or more additional components are between "A" component and "B" component. Accordingly, the drawings and descriptions will be regarded as illustrative in nature and not as restrictive.

Figure 1:
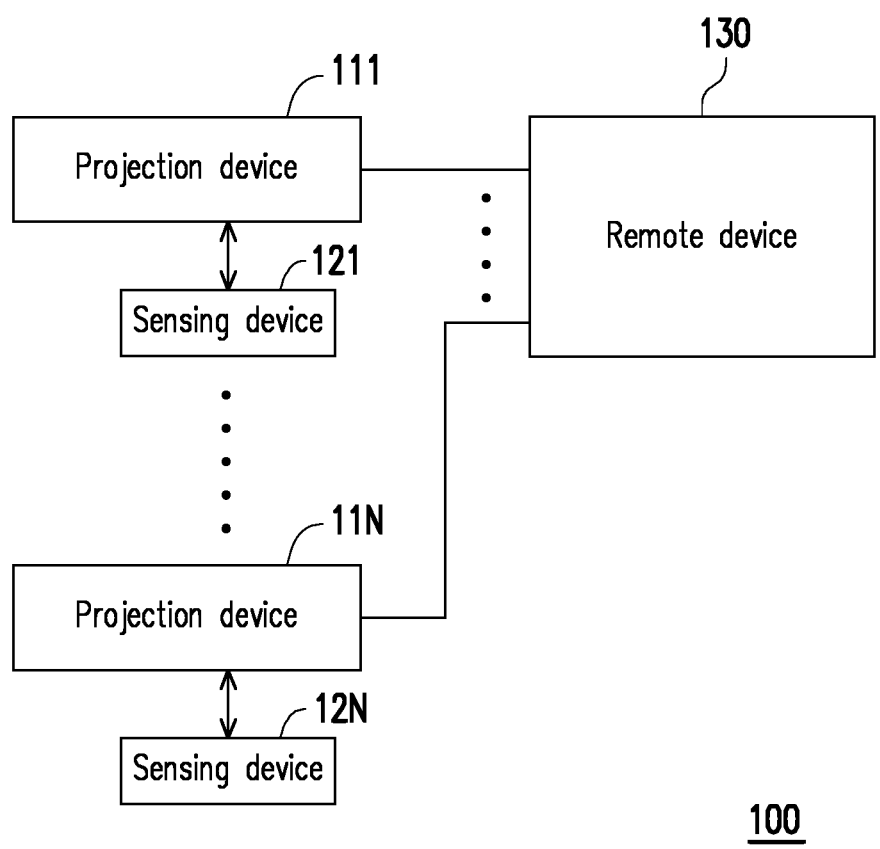
FIG. 1 is a schematic diagram of a projection system according to an embodiment of the invention.

Referring to FIG. 1, FIG. 1 is a schematic diagram of a projection system according to an embodiment of the invention. In the embodiment, the projection system 100 includes projection devices 111-11N, sensing devices 121-12N and a remote device 130. In the embodiment, the sensing devices 121-12N respectively correspond to the projection devices 111-11N, and are respectively coupled to the projection devices 111-11N. In an embodiment, each of the sensing devices 121-12N and the corresponding projection device 111-11N coupled thereto may be integrated in one projection apparatus (not shown). Namely, each of the sensing devices 121-12N may be disposed in the corresponding projection apparatus (not shown), where each of the projection apparatuses (not shown) has the corresponding projection device 111-11N and the corresponding sensing device 121-12N. In an embodiment, each of the sensing devices 121-12N may also be disposed outside the projection apparatus (not shown) having the corresponding projection device 111-11N. Namely, each of the projection apparatuses (not shown) has the corresponding projection device 111-11N but doesn't have the corresponding sensing device 121-12N. In the embodiment, at least one sensing device 121-12N may sense a plurality of environmental parameters and a plurality of device output values on at least one projection device 111-11N. For example, in the embodiment, the at least one sensing devices 121-12N may respectively sense a plurality of environmental parameters and a plurality of device output values on the at least one projection devices 111-11N, and output the sensed environmental parameters and the device output values to the remote device 130.

In the embodiment, the remote device 130 is coupled to the projection devices 111-11N through a wired signal transmission interface or a wireless signal transmission interface, and may implement information transmission with the projection devices 111-11N through a wired or wireless signal transmission manner. In the embodiment, the wired or wireless signal transmission interface may be a wired network device or a wireless network device, though the invention is not limited thereto. In the embodiment, the remote device 130 may receive the environmental parameters and the device output values sensed by the sensing devices 121-12N, and execute state analysis for at least one projection device 111-11N according to the environmental parameters and the device output values to generate at least one analysis result. For example, in the embodiment, the remote device 130 executes the state analysis for each of the projection devices 111-11N according to the environmental parameters and the device output values to generate a plurality of analysis results respectively corresponding to the projection devices 111-11N.

In the embodiment, the remote device 130 further generates a command signal according to the at least one analysis result, and transmits the command signal to the at least one projection device 111-11N, such that the corresponding projection device 111-11N executes a self-protection procedure according to the command signal. For example, in the embodiment, the remote device 130 may generate the command signal according to each of the analysis results, and transmits the command signal to the corresponding projection devices 111-11N, such that the corresponding projection devices 111-11N execute the self-protection procedure according to the command signal.

In the embodiment, the remote device 130 may be a cloud server, and includes a processor having computation capability. In the embodiment, the remote device 130 may adopt a computation method such as an algorithm, large data analysis, historical records, or correlations to obtain accurate computation results, though the invention is not limited thereto. For example, in terms of the correlation of the projection devices of a same production batch, the projection devices of the same production batch probably have the same or similar problems, and such correlation is helpful for the subsequent judgement and analysis to achieve accurate execution of the self-protection procedure and maintain availability of the projection devices.

In terms of details, the projection device 111 and the sensing device 121 are taken as an example for description. The sensing device 121 is used for sensing a plurality of the environmental parameters and a plurality of the device output values of the projection device 111. In the embodiment, the environmental parameters may include at least one of a temperature, humidity and a density of atmospheric suspended particulate, and the device output values may include at least one of brightness of a light source, an image chrominance, an image neatness and a wind force of a cooling fan. For example, when a color shift of the image occurs or the image has dirty stains, it can be learned through the device output value such as the image chrominance or the image neatness to facilitate executing the subsequent self-protection procedure.

According to the above description, the projection device 111 and the sensing device 121 are taken as an example for description. On the other hand, the environmental parameters and the device output values obtained by the sensing device 121 may be respectively compared with a plurality of warning values to respectively generate a plurality of first comparison results. The warning values of the embodiment are, for example, predetermined warning values, though the invention is not limited thereto. However, the aforementioned comparison operation may be executed in the projection device 111, or may be executed in the remote device 130, which is not limited by the invention. Moreover, in the embodiment, the projection device 111 or the remote device 130 may generate a warning signal according to the aforementioned first comparison results. In the embodiment, the warning signal may further indicate the deteriorated devices or devices close to the edge of malfunction.

According to the above description, for example, if brightness of a light source of the projection device 111 is lower than the corresponding warning value, it represents that the light source of the projection device 111 is a deteriorated device, and is probably close to the edge of malfunction, and now the projection device 111 or the remote device 130 may generate the corresponding warning signal. For another example, if a wind force generated by a cooling fan of the projection device 111 is lower than the corresponding warning value, it represents that the cooling fan of the projection device 110 is another deteriorated device and is probably close to the edge of malfunction, and now the projection device 111 or the remote device 130 may generate the corresponding warning signal.

It should be noted that in the embodiment, the warning signal may also indicate the deteriorated device or the device close to the edge of malfunction in the corresponding projection devices. Therefore, in the embodiment, the deteriorated devices in the corresponding projection devices can be determined by reading the warning signal.

Moreover, taking the projection device 111 as an example, in the embodiment, the environmental parameter and the device output value obtained by the sensing device 121 may be respectively compared with a plurality of threshold values to respectively generate a plurality of second comparison results. The threshold values of the embodiment are, for example, predetermined threshold values, though the invention is not limited thereto. However, the aforementioned comparison operation may be executed in the projection device 111 or may be executed in the remote device 130, which is not limited by the invention. Moreover, in the embodiment, the projection device 111 or the remote device 130 may generate a malfunction signal according to the second comparison result. In the embodiment, the malfunction signal may indicate whether the projection device 111 has a malfunctioned device and may further indicate the malfunctioned device.

In the embodiment, under a condition of determining deterioration of a device, the threshold value is a more strict value compared to the warning value, i.e. the threshold value is used for representing a more deteriorated value compared to the warning value. To be specific, in the embodiment, an absolute value of a difference between each of the warning values and a corresponding standard value is smaller than an absolute value of a difference between each of the threshold values and the corresponding standard value.

However, the warning value/threshold value of the above embodiment may be set by adding or subtracting a shift value to a standard value of the corresponding device output value. In the embodiment, the warning value/threshold value corresponding to each of the device output values may be set according to at least one environmental parameter, and the above warning value/threshold value may be adjusted according to at least one environmental parameter. For example, under the conditions of different environment temperatures, humidity and densities of atmospheric suspended particulate, the standard values of the brightness provided by the light source may be different, so that the warning value/threshold value of the corresponding brightness of the light source may be dynamically adjusted according to the environmental parameters. Similarly, in the embodiment, under different environmental parameters, the standard values of the wind force provided by the cooling fan may also be different, so that the warning value/threshold value of the wind force of the cooling fan may also be dynamically adjusted according to the environmental parameters.

In the embodiment, the remote device 130 may perform an analysis according to at least one of the malfunction signal and the warning signal to generate at least one analysis result corresponding to the at least one projection device 111-11N. In the remote device 130 of the embodiment, a plurality of pending command signals may be set according to possible deterioration states of each of the at least one projection devices 111-11N. In the embodiment, the remote device 130 may learn the deterioration state of the at least one projection device 111-11N according to the aforementioned analysis results, and the remote device 130 may select one of the pending command signals according to a comparison result to generate the command signal by comparing the above deterioration state with the possible deterioration states corresponding to the pending command signals. In brief, in the embodiment, the remote device 130 receives at least one of the warning signal and the malfunction signal, and selects one of the pending command signals to generate the command signal according to at least one of the warning signal and the malfunction signal.

In the embodiment, the remote device 130 transmits the generated command signal to the corresponding projection device (for example, the projection device 111), and the projection device 111 executes the self-protection procedure according to the command signal. In the embodiment, the self-protection procedure includes at least one of a self-repair procedure and a shutdown procedure. To be specific, in the embodiment, the projection device 111 may execute at least one of the self-repair procedure and the shutdown procedure according to the command signal.

Moreover, in the embodiment, each of the sensing devices 121-12N may include a plurality of sensors (not shown). In the embodiment, the plurality of sensors may be respectively disposed at different parts of the corresponding projection device 111-11N to respectively sense related information such as the environment temperature, the humidity, the density of atmospheric suspended particulate, a rotation speed of the cooling fan, brightness of the light source, an output voltage and/or an output current generated by a driving circuit, and/or a projection image generated by the projection device.

In the embodiment, the remote device 130 may further categorize a plurality of error states produced by the projection devices 111-11N, and generate a plurality of error counting values respectively corresponding to a plurality of error categories. For example, the remote device 130 categorizes a plurality of error states produced by the projection devices 111-11N, and generates error categories such as light source deterioration, inadequate rotation speed of the cooling fan, etc., and counts the error counting values of each of the error categories of the projection devices 111-11N. In the embodiment, the remote device 130 may output the error category having the maximum error counting value by counting the error counting values of each of the error categories, and a technician may learn an error state frequently occurred in the projection devices 111-11N, and accordingly perform design adjustment on the projection devices 111-11N according to the frequently occurred error state to further optimize the projection devices 111-11N.

Regarding the self-repair procedure, in the embodiment, the projection device (for example, the projection device 111) may include a plurality of backup devices, for example, at least one of a backup cooler (backup cooling fan), a backup light source, a backup light source driving circuit and a backup cooler driving circuit. In the embodiment, when the projection device 111 receives the command signal sent by the remote device 130, the projection device 111 may look up a deterioration device in the projection device 111 according to the command signal, and may shutdown the deterioration device and activate the backup device corresponding to the deterioration device to maintain a normal operation of the projection device 111.

Figure 2:
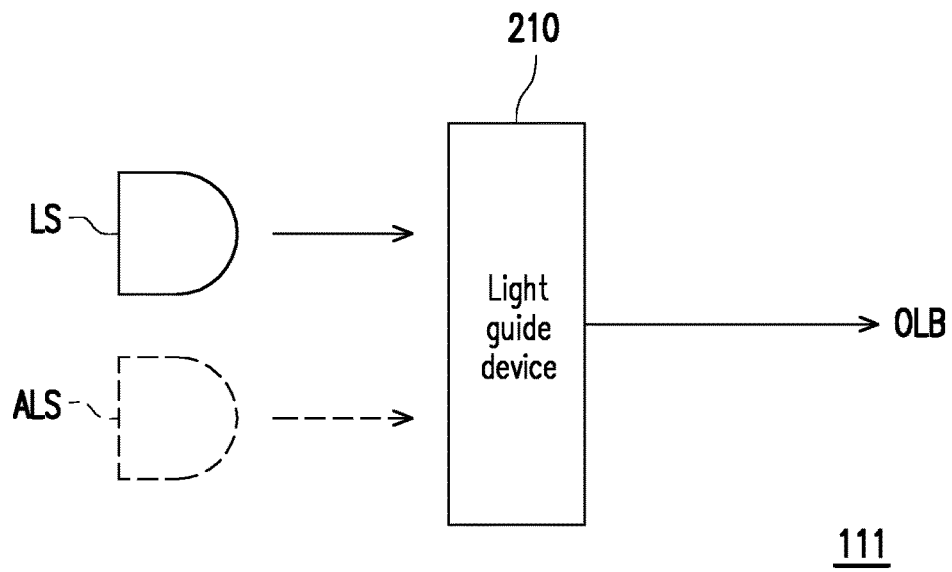
FIG. 2 is a schematic diagram of an implementation of a self-repair procedure according to an embodiment of the invention.

For example, FIG. 2 is a schematic diagram of an implementation of the self-repair procedure according to an embodiment of the invention. In the embodiment, a light source LS and a corresponding backup light source ALS are configured in the projection device 111. In the embodiment, when the command signal sent by the remote device 130 indicates that the light source LS is the deterioration device and it is required to activate the backup light source ALS, the projection device 111 may shutdown the light source LS according to the command signal, and activate the backup light source ALS to provide a light beam. In the embodiment, the light beam provided by the backup light source ALS may produce an output light beam OLB through a light guide device 210, though the invention is not limited thereto.

The light guide device 210 of the embodiment is an optical device well known by those skilled in the art, which is used for guiding the light beam produced by one of the light source LS and the backup light source ALS and projecting the same to a required projection path.

Figure 3:
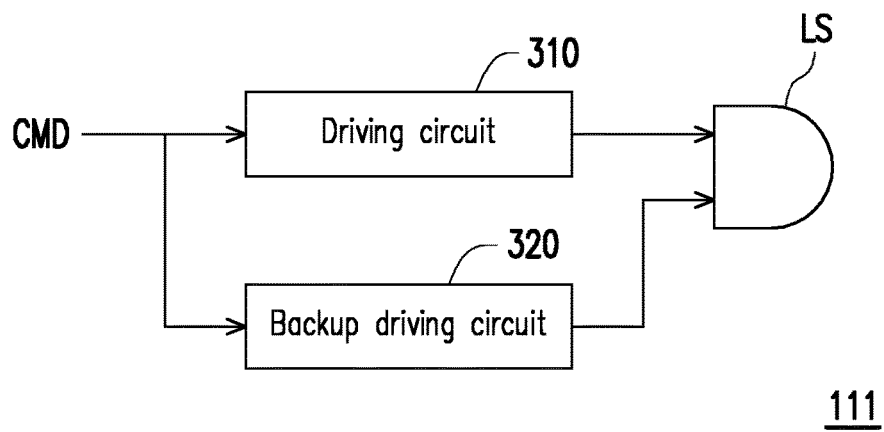
FIG. 3 is a schematic diagram of another implementation of the self-repair procedure according to an embodiment of the invention.

FIG. 3 is a schematic diagram of another implementation of the self-repair procedure according to an embodiment of the invention. In the embodiment of FIG. 3, the projection device 111 includes a driving circuit 310 used for driving the light source LS and a backup driving circuit 320 corresponding to the driving circuit 310. In the embodiment, the driving circuit 310 and the backup driving circuit 320 are coupled to the light source LS, and receive a command signal CMD. In the embodiment, when a deterioration phenomenon of the light source LS occurs, the backup driving circuit 320 may be not activated first, and only the driving circuit 310 is activated. Moreover, in the embodiment, the driving circuit 310 of the projection device 111 may adjust (for example, enhance) a driving signal (for example, at least one of a driving current and a driving voltage of the light source LS) produced by the driving circuit 310 according to the command signal CMD to adjust (for example, increase) a luminous intensity of the light source LS to implement the self-repair procedure, and achieve a self-repair effect.

On the other hand, in the embodiment, when it is determined that the deterioration device is not the light source LS but is the driving circuit 310, the projection device 111 may disable (shutdown) the driving circuit 310, and activate the backup driving circuit 320 to produce at least one of the driving current and the driving voltage to drive the light source LS to achieve the self-repair effect.

In the embodiment, regarding a method for determining whether the driving circuit 310 is the deterioration device, the projection device 111 measure the driving voltage and the driving current produced by the driving circuit 310 by using the sensing device 121, and it can be determined whether the driving circuit 310 is the deterioration device by comparing the driving voltage and the driving current with the corresponding warning value and the threshold value.

In the embodiment, the implementations of FIG. 2 and FIG. 3 may be combined for implementing in the projection device 111, and the normal operation of the projection device 111 can be guaranteed by simultaneously configuring the backup light source ALS and the backup driving circuit 320.

Figure 4:
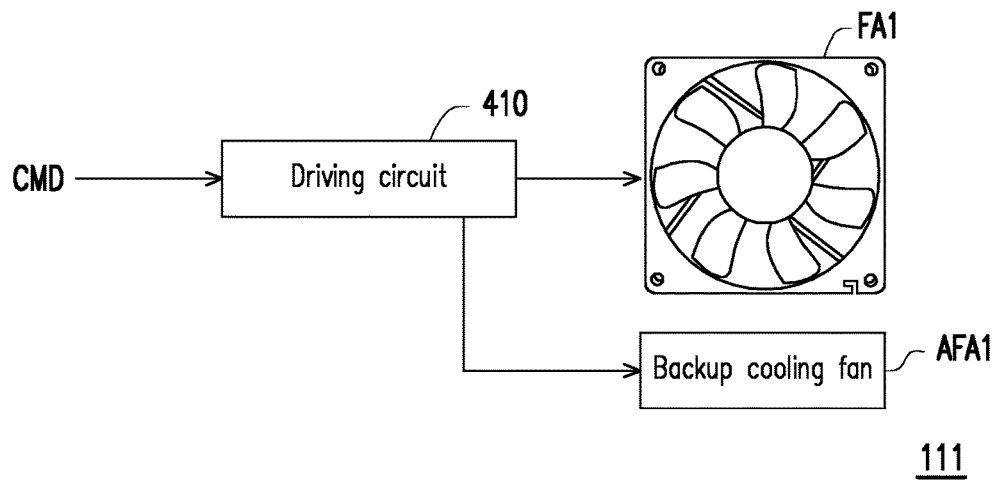
FIG. 4 and FIG. 5 are schematic diagrams of two other implementations of the self-repair procedure according to embodiments of the invention.
Figure 5:
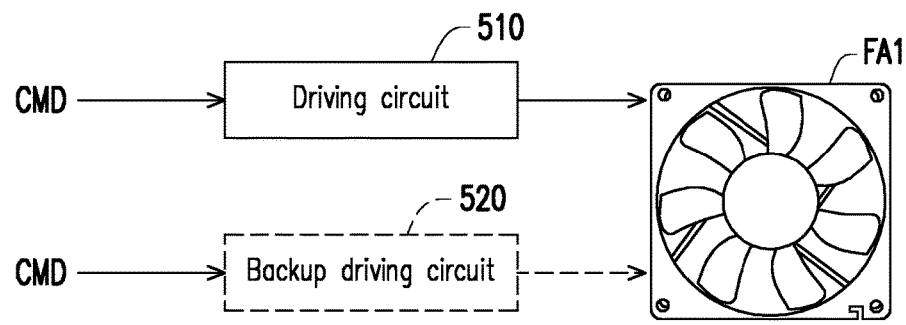

FIG. 4 and FIG. 5 are schematic diagrams of two other implementations of the self-repair procedure according to embodiments of the invention. Taking the projection device 111 as an example, in the embodiment of FIG. 4, a cooling fan FA1, a backup cooling fan AFA1 and a driving circuit 410 are configured in the projection device 111. Referring to FIG. 1 to FIG. 4, in the embodiment, when the remote device 130 determines that the cooling fan FA1 is probably the deterioration device, the driving circuit 410 of the projection device 111 may adjust (for example, increase) at least one of the driving current and the driving voltage transmitted to the cooling fan FA1 according to the command signal CMD to adjust (for example, increase) a rotation speed of the cooling fan FA1 to adjust (for example, increase) a wind force produced by the cooling fan FA1 to satisfy a demand. However, in the embodiment, after the driving current and the driving voltage of the cooling fan FA1 is increased, if the wind force produced by the cooling fan FA1 is still unable to satisfy the demand, the driving circuit 410 of the projection device 111 may further disable the cooling fan FA1 according to the command signal CMD, and enable the backup cooling fan AFA1 to implement the cooling function.

In the embodiment, the driving circuit 410 may disable the cooling fan FA1 by stop providing the driving current and the driving voltage to the cooling fan FA1, and enable the backup cooling fan AFA1 by providing at least one of the driving current and the driving voltage to the backup cooling fan AFA1.

Taking the projection device 111 as an example, in the embodiment of FIG. 5, a driving circuit 510 and a backup driving circuit 520 may be configured in the projection device 111 for driving the cooling fan FA1. In the embodiment, when it is determined that the driving circuit 510 is the deterioration device, the projection device 111 may disable the driving circuit 510 according to the command signal CMD, and enable the backup driving circuit 520 to generate at least one of the driving current and the driving voltage to maintain a normal operation of the cooling fan FA1.

However, in the embodiment, the implementations of FIG. 2 to FIG. 5 may be combined for implementing in the projection device 111 to further guarantee the normal operation of the projection device 111.

In the embodiment, if the remote device 130 cannot select a proper pending command signal according to the analysis result, the remote device 130 may generate a command signal to turn off the projection device. Moreover, in the embodiment, the remote device 130 may further generate a malfunction signal and a warning signal related to each of the projection devices 111-11N, and provide related information to manufacturers responsible for maintenance to arrange the subsequent maintenance action.

Figure 6:
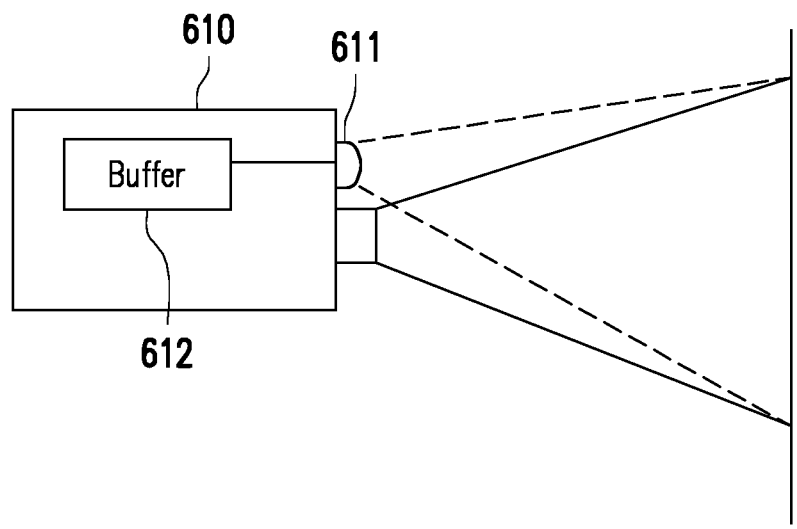
FIG. 6 is a schematic diagram of an implementation of a projection device according to an embodiment of the invention.

Referring to FIG. 6, FIG. 6 is a schematic diagram of an implementation of a projection device according to an embodiment of the invention. In the embodiment, a projection image capturing device 611 and a buffer 612 are configured to the projection device 610, where the projection image capturing device 611 is, for example, disposed outside the projection device 610, and the buffer 612 is, for example, disposed inside the projection device 610. In the embodiment, the projection image capturing device 611 is, for example, a camera, though the invention is not limited thereto. In the embodiment, the projection image capturing device 611 captures a projection image (an image beam) produced by the projection device 610 according to an original image. In the embodiment, the projection device 610 stores the captured projection image acquired by the projection image capturing device 611 in the buffer 612. As shown in FIG. 1 and FIG. 6, in the embodiment, the projection device 610 compares the original image and the captured projection image to generate an image detection result, and transmits the image detection result to the remote device 130. In the embodiment, the buffer 612 may store the captured projection image of one frame.

In the embodiment, when the original image and the captured projection image are different, the projection system may determine that the projection image generated by the projection device 610 has a damaged figure phenomenon, and the remote device 130 may generate the command signal according to the image analysis result to cause the projection device 610 to execute the self-projection procedure.

In the embodiment, as shown in FIG. 1 and FIG. 6, the projection device 610 may not store the captured projection image to the buffer 612, but may transmit information of the captured projection image and the corresponding original image to the remote device 130. The remote device 130 may compare the original image and the captured projection image to generate the image detection result, and generate the command signal according to the received image detection result to cause the projection device 610 to execute the self-protection procedure.

In the embodiment, the projection image capturing device 611 may be an camera device located outside the projection device 610 (for example, a camera device on a mobile phone), though the invention is not limited thereto. In the embodiment, the image capturing device may transmit information of the captured projection image to at least one of the projection device 610 and the remote device 130 through a wired or wireless transmission interface.

The buffer 612 of the embodiment may be any type of a memory, which is not limited by the invention.

Figure 7:
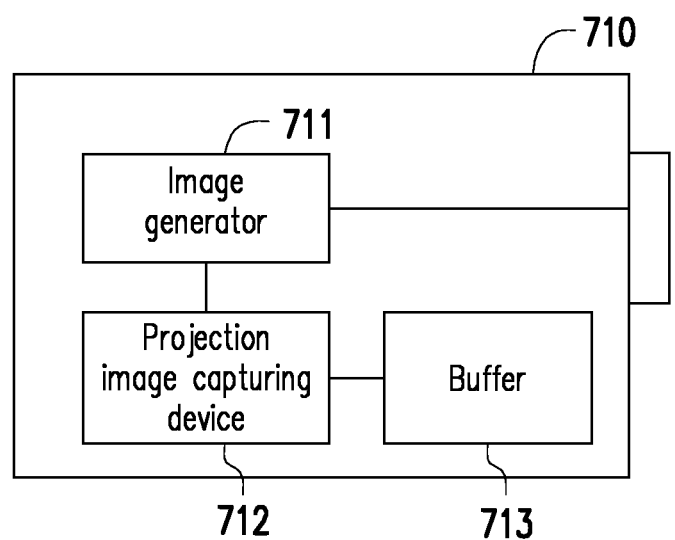
FIG. 7 is a schematic diagram of another implementation of a projection device according to another embodiment of the invention.

Referring to FIG. 7, FIG. 7 is a schematic diagram of another implementation of a projection device according to another embodiment of the invention. In the embodiment, the projection device 710 includes an image generator 711, a projection image capturing device 712 and a buffer 713. In the embodiment, the projection image capturing device 712 is coupled to the image generator 711 and the buffer 713. In the embodiment, when the image generator 711 generates a projection image according to an original image, the projection image capturing device 712 may directly receive image data of the projection image generated by the image generator 711 to acquire related information of the captured projection image. In the embodiment, the projection image capturing device 712 stores the related information of the captured projection image to the buffer 713. In the embodiment, the projection image capturing device 712 is, for example, a projection image capturing circuit, though the invention is not limited thereto.

Implementations of backup hardware are mainly described above, though in the embodiment, as shown in FIG. 1, one or a plurality of backup firmware programs may be configured in the remote device 130. In the embodiment, the remote device 130 may determine to provide at least one backup firmware program to the at least one projection device according to the at least one generated analysis result, such that the at least one projection device may execute an update operation of the backup firmware program. In the embodiment, the backup firmware programs may be uploaded to the remote device 130 by a technician. In the embodiment, the technician may also set the remote device 130 to compulsively send the command signal to make a part of or all of the projection devices in the projection system to execute the update operation of the firmware program.

In the embodiment, when the aforementioned damaged figure phenomenon occurs, the self-repair procedure of the projection device may be executed through the update operation of the firmware program.

However, the projection system 100 including a plurality of the projection devices 111-11N and a plurality of the sensing devices 121-12N is an embodiment of the invention. In an embodiment that is not illustrated, the projection system may also have one projection device and one sensing device, i.e. the amounts of the projection devices and the sensing devices are not limited by the invention. Moreover, in other embodiments, the projection devices 111-11N of FIG. 1 may be replaced by a plurality of display devices. Similarly, the aforementioned projection system 100 including a plurality of display devices and a plurality of the sensing devices 121-12N is an embodiment of the invention, and the projection system may also have one display device and one sensing device, i.e. the amounts of the display devices and the sensing devices are not limited by the invention.

Figure 8:
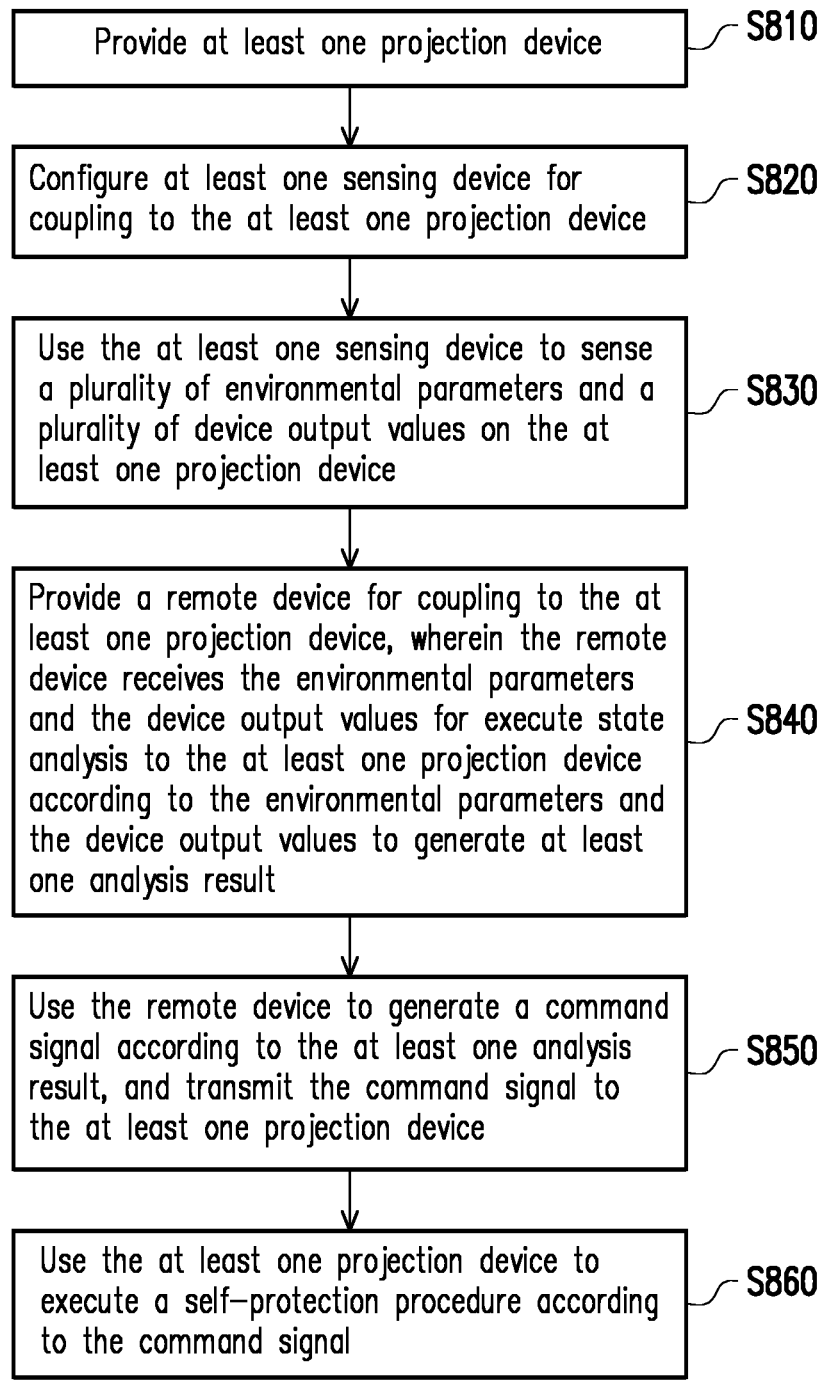
FIG. 8 is a flowchart illustrating a monitoring method of a projection system according to an embodiment of the invention.

Referring to FIG. 8, FIG. 8 is a flowchart illustrating a monitoring method of a projection system according to an embodiment of the invention. In step S810, at least one projection device is provided. In step S820, at least one sensing device is configured for coupling to the at least one projection device. In step S830, the at least one sensing device is applied to sense a plurality of environmental parameters and a plurality of device output values on the at least one projection device. In step S840, a remote device is provided for coupling to the at least one projection device, where the remote device receives the environmental parameters and the device output values to execute state analysis for the at least one projection device according to the environmental parameters and the device output values to generate at least one analysis result. In step S850, the remote device is applied to generate a command signal according to the at least one analysis result, and transmit the command signal to the at least one projection device. In step S860, the at least one projection device is applied to execute a self-protection procedure according to the command signal. However, in other embodiments, the at least one projection device in the step S810, the step S820, the step S830 and the step S840 of FIG. 8 may be replaced by at least one display device.

Figure 9:
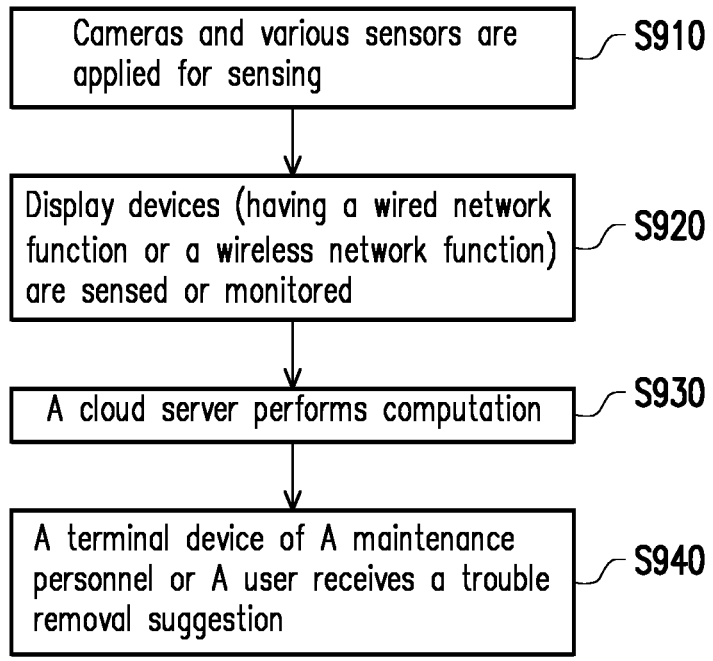
FIG. 9 and FIG. 10 are flowcharts illustrating monitoring methods of a projection system according to two other embodiments of the invention.
Figure 10:
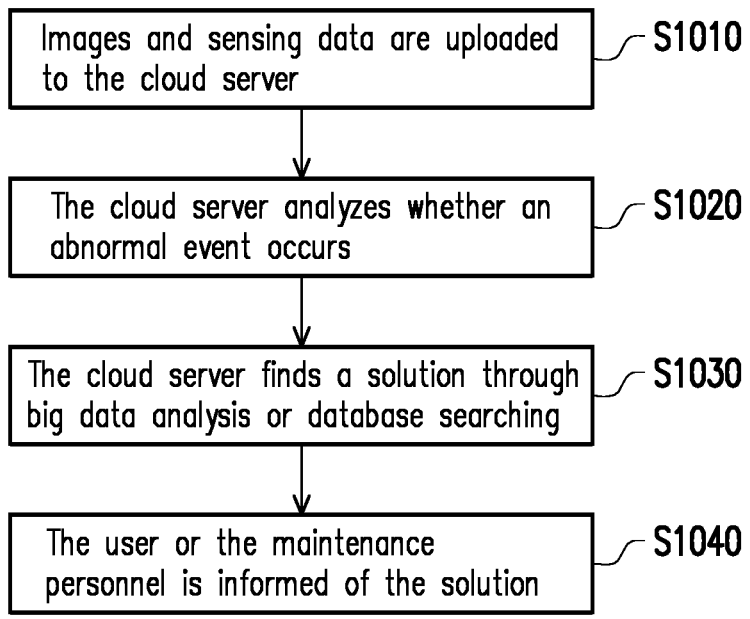

FIG. 9 and FIG. 10 are flowcharts illustrating monitoring methods of a projection system according to two other embodiments of the invention. Referring to FIG. 9 first, in step S910, cameras and various sensors are applied for sensing. In step S920, display devices (having a wired network function or a wireless network function) are sensed or monitored. In an embodiment, the display devices provide sensing results/monitoring results to a cloud server through a wired network or a wireless network. In step S930, the cloud server performs computation. When abnormity occurs, a maintenance personnel or a user is informed through the wired/wireless network. In step S940, a terminal device of the maintenance personnel or the user receives a trouble removal suggestion. Similarly, referring to FIG. 10, in step S1010, images and sensing data are uploaded to the cloud server. In step S1020, the cloud server analyzes whether an abnormal event occurs. If the abnormal event does not occur, the flow returns to the step S1010. If the abnormal event occurs, a step S1030 is executed. In the step S1030, the cloud server finds a solution through big data analysis or database searching. In step S1040, the user or the maintenance personnel is informed of the solution. In an embodiment, the user/maintenance personnel may acquire an abnormity occurrence notification through a display device such as a projector, an light-emitting diode (LED) wall, a planar display (for example, liquid crystal display (LCD)), etc., or a terminal device such as a mobile phone, a computer, etc., where the abnormity occurrence notification may be an application (APP) notification of the mobile phone, a message notification of the mobile phone, a software notification or an email notification of a computer, though the invention is not limited thereto. In an embodiment, after acquiring the abnormity occurrence notification, the maintenance personnel/user may use the terminal device such as the mobile phone or the computer to execute/press "agree to repair suggestion" to perform an automatic setting adjustment procedure or a firmware update procedure, though the invention is not limited thereto.

Implementation methods and implementation details of the above steps have been described in the aforementioned embodiments, and details thereof are not repeated.

In summary, in the embodiment of the invention, state analysis is performed on the projection device or the display device by sensing a plurality of environmental parameters and a plurality of device output values on the projection device or the display device. In the embodiments of the invention, the remote device generates the command signal according to the analysis result of the state analysis. In the embodiments of the invention, the projection device or the display device executes the self-protection procedure according to the command signal to maintain a normal operation of the projection device.

The foregoing description of the preferred embodiments of the invention has been presented for purposes of illustration and description. It is not intended to be exhaustive or to limit the invention to the precise form or to exemplary embodiments disclosed. Accordingly, the foregoing description should be regarded as illustrative rather than restrictive. Obviously, many modifications and variations will be apparent to practitioners skilled in this art. The embodiments are chosen and described in order to best explain the principles of the invention and its best mode practical application, thereby to enable persons skilled in the art to understand the invention for various embodiments and with various modifications as are suited to the particular use or implementation contemplated. It is intended that the scope of the invention be defined by the claims appended hereto and their equivalents in which all terms are meant in their broadest reasonable sense unless otherwise indicated. Therefore, the term "the invention", "the present invention" or the like does not necessarily limit the claim scope to a specific embodiment, and the reference to particularly preferred exemplary embodiments of the invention does not imply a limitation on the invention, and no such limitation is to be inferred. The invention is limited only by the spirit and scope of the appended claims. The abstract of the disclosure is provided to comply with the rules requiring an abstract, which will allow a searcher to quickly ascertain the subject matter of the technical disclosure of any patent issued from this disclosure. It is submitted with the understanding that it will not be used to interpret or limit the scope or meaning of the claims. Any advantages and benefits described may not apply to all embodiments of the invention. It should be appreciated that variations may be made in the embodiments described by persons skilled in the art without departing from the scope of the invention as defined by the following claims. Moreover, no element and component in the disclosure is intended to be dedicated to the public regardless of whether the element or component is explicitly recited in the following claims.

What is claimed is:

1. A projection system, comprising:
   at least one projection device;
   at least one sensing device, coupled to the at least one projection device; and
   a remote device, coupled to the at least one projection device,
   wherein the at least one sensing device senses a plurality of environmental parameters and a plurality of device output values on the at least one projection device, the remote device receives the plurality of environmental parameters and the plurality of device output values to execute state analysis for the at least one projection device according to the plurality of environmental parameters and the plurality of device output values to generate at least one analysis result,
   wherein the remote device further generates a command signal according to the at least one analysis result, and transmits the command signal to the at least one projection device,
   wherein the at least one projection device executes a self-protection procedure according to the command signal.

2. The projection system as claimed in claim 1, wherein the at least one projection device or the remote device respectively compares the plurality of environmental parameters and the plurality of device output values with a plurality of corresponding warning values to generate a plurality of first comparison results, and generates a warning signal according to the plurality of first comparison results, wherein the at least one projection device or the remote device respectively compares the plurality of environmental parameters and the plurality of device output values with a plurality of corresponding threshold values to generate a plurality of second comparison results, and generates a malfunction signal according to the plurality of second comparison results,
   wherein an absolute value of a difference between each of the plurality of corresponding warning values and a corresponding standard value is smaller than an absolute value of a difference between each of the plurality of corresponding threshold values and the corresponding standard value.

3. The projection system as claimed in claim 2, wherein a plurality of pending command signals is set in the remote device, the remote device receives at least one of the warning signal and the malfunction signal, and selects at least one of the pending command signals to generate the command signal according to at least one of the warning signal and the malfunction signal.

4. The projection system as claimed in claim 2, wherein the at least one projection device or the remote device sets the warning value and the threshold value corresponding to each of the plurality of device output values according to at least one of the plurality of environmental parameters.

5. The projection system as claimed in claim 1, wherein the at least one projection device comprises a plurality of backup devices,
   wherein the at least one projection device enables at least one of the plurality of backup devices according to the command signal.

6. The projection system as claimed in claim 5, wherein the plurality of backup devices comprise at least one of a backup cooler, a backup light source, a backup light source driving circuit and a backup cooler driving circuit.

7. The projection system as claimed in claim 1, wherein the at least one projection device finds out a deterioration device in the at least one projection device according to the command signal, and the at least one projection device adjusts a driving signal of the deterioration device to execute the self-protection procedure.

8. The projection system as claimed in claim 7, wherein when the deterioration device is a cooling fan in the at least one projection device, the at least one projection device increases at least one of a driving current a driving voltage of the cooling fan according to the command signal to adjust a rotation speed of the cooling fan.

9. The projection system as claimed in claim 7, wherein when the deterioration device is a light source in the at least one projection device, the at least one projection device increases at least one of a driving current a driving voltage of the light source according to the command signal to adjust a brightness of the light source.

10. The projection system as claimed in claim 1, wherein the at least one projection device executes at least one of a repair operation and a shutdown operation according to the command signal.

11. The projection system as claimed in claim 1, wherein the at least one projection device further comprises:
    a projection image capturing device, capturing a projection image generated by the at least one projection device according to an original image,
    wherein at least one of the at least one projection device and the remote device compares the original image and a captured projection image to generate an image detection result, and transmits the image detection result to the remote device.

12. The projection system as claimed in claim 1, wherein at least one backup firmware program is set in the remote device, and the remote device provides the at least one backup firmware program to the at least one projection device according to the at least one analysis result.

13. The projection system as claimed in claim 1, wherein when the at least one projection device is a plurality of projection devices, the remote device categorizes a plurality of error states respectively produced by the plurality of projection devices, and generates a plurality of error counting values respectively corresponding to a plurality of error categories.

14. The projection system as claimed in claim 13, wherein the remote device outputs the error category corresponding to the maximum one of the plurality of error counting values.

15. A monitoring method of a projection system, comprising:
    providing at least one projection device;
    configuring at least one sensing device for coupling to the at least one projection device;
    using the at least one sensing device to sense a plurality of environmental parameters and a plurality of device output values on the at least one projection device;
    providing a remote device for coupling to the at least one projection device, wherein the remote device receives the plurality of environmental parameters and the plurality of device output values to execute state analysis for the at least one projection device according to the plurality of environmental parameters and the plurality of device output values to generate at least one analysis result;

using the remote device to generate a command signal according to the at least one analysis result, and transmitting the command signal to the at least one projection device; and using the at least one projection device to execute a self-protection procedure according to the command signal.

16. The monitoring method of the projection system as claimed in claim 15, further comprising:

respectively comparing the plurality of environmental parameters and the plurality of device output values with a plurality of corresponding warning values to generate a plurality of first comparison results, and generating a warning signal according to the plurality of first comparison results; and respectively comparing the plurality of environmental parameters and the plurality of device output values with a plurality of corresponding threshold values to generate a plurality of second comparison results, and generating a malfunction signal according to the plurality of second comparison results, wherein an absolute value of a difference between each of the plurality of corresponding warning values and a corresponding standard value is smaller than an absolute value of a difference between each of the plurality of corresponding threshold values and the corresponding standard value.

17. The monitoring method of the projection system as claimed in claim 16, wherein the step of providing the remote device for coupling to the at least one projection device, wherein the remote device receives the plurality of environmental parameters and the plurality of device output values to execute state analysis for the at least one projection device according to the plurality of environmental parameters and the plurality of device output values to generate at least one analysis result comprises:

setting a plurality of pending command signals in the remote device; and receiving at least one of the warning signal and the malfunction signal, and selecting at least one of the pending command signals to generate the command signal according to at least one of the warning signal and the malfunction signal.

18. The monitoring method of the projection system as claimed in claim 16, further comprising:

setting the warning value and the threshold value corresponding to each of the plurality of device output values according to at least one of the plurality of environmental parameters.

19. The monitoring method of the projection system as claimed in claim 15, wherein the step of using the at least one projection device to execute the self-protection procedure according to the command signal comprises:

setting a plurality of backup devices in the at least one projection device; and enabling at least one of the plurality of backup devices according to the command signal.

20. The monitoring method of the projection system as claimed in claim 19, wherein the plurality of backup devices comprise at least one of a backup cooler, a backup light source, a backup light source driving circuit and a backup cooler driving circuit.

21. The monitoring method of the projection system as claimed in claim 15, wherein the step of using the at least one projection device to execute the self-protection procedure according to the command signal comprises:

finding out a deterioration device in the at least one projection device according to the command signal; and using the at least one projection device to adjust a driving signal of the deterioration device to execute the self-protection procedure.

22. The monitoring method of the projection system as claimed in claim 21, wherein when the deterioration device is a cooling fan in the at least one projection device, the step of using the at least one projection device to adjust the driving signal of the deterioration device to execute the self-protection procedure comprises:

using the at least one projection device to increase at least one of a driving current and a driving voltage of the cooling fan according to the command signal for adjusting a rotation speed of the cooling fan.

23. The monitoring method of the projection system as claimed in claim 21, wherein when the deterioration device is a light source in the at least one projection device, the step of using the at least one projection device to adjust the driving signal of the deterioration device to execute the self-protection procedure comprises:

using the at least one projection device to increase at least one of a driving current and a driving voltage of the light source according to the command signal to adjust a brightness of the light source.

24. The monitoring method of the projection system as claimed in claim 15, further comprising:

using the at least one projection device to execute at least one of a repair operation and a shutdown operation according to the command signal.

25. The monitoring method of the projection system as claimed in claim 15, further comprising:

detecting a projection image generated by the at least one projection device according to an original image;

comparing the original image and the projection image to generate an image detection result; and using at least one of the projection device or the remote device to transmit the image detection result to the remote device.

26. The monitoring method of the projection system as claimed in claim 15, further comprising:

setting at least one backup firmware program in the remote device; and using the remote device to provide the at least one backup firmware program to the at least one projection device according to the at least one analysis result.

27. The monitoring method of the projection system as claimed in claim 15, wherein the plurality of environmental parameters comprise at least one of a temperature, humidity and a density of atmospheric suspended particulate, and the plurality of device output values comprise at least one of at least one of brightness of a light source, an image chrominance, an image neatness and a wind force of a cooling fan.

28. The monitoring method of the projection system as claimed in claim 15, further comprising:

when the at least one projection device is a plurality of projection devices, using the remote device to categorize a plurality of error states respectively produced by the plurality of projection devices, and generating a plurality of error counting values respectively corresponding to a plurality of error categories.

29. The monitoring method of the projection system as claimed in claim 28, further comprising:
 outputting the error category corresponding to the maximum one of the plurality of error counting values.

30. A display system, comprising:
 at least one display device;
 at least one sensing device, coupled to the at least one display device; and
 a remote device, coupled to the at least one display device, wherein the at least one sensing device senses a plurality of environmental parameters and a plurality of device output values on the at least one display device, the remote device receives the plurality of environmental parameters and the plurality of device output values to execute state analysis for the at least one display device according to the plurality of environmental parameters and the plurality of device output values to generate at least one analysis result,
 wherein the remote device further generates a command signal according to the at least one analysis result, and transmits the command signal to the at least one display device,
 wherein the at least one display device executes a self-protection procedure according to the command signal.

31. A monitoring method of a display system, comprising:
 providing at least one display device;
 configuring at least one sensing device for coupling to the at least one display device;
 using the at least one sensing device to sense a plurality of environmental parameters and a plurality of device output values on the at least one display device;
 providing a remote device for coupling to the at least one display device, wherein the remote device receives the plurality of environmental parameters and the plurality of device output values to execute state analysis for the at least one display device according to the plurality of environmental parameters and the plurality of device output values to generate at least one analysis result;
 using the remote device to generate a command signal according to the at least one analysis result, and transmitting the command signal to the at least one display device; and
 using the at least one display device to execute a self-protection procedure according to the command signal.

* * * * *